United States Patent
Caullet et al.

(10) Patent No.: US 8,372,376 B2
(45) Date of Patent: Feb. 12, 2013

(54) IM-13 CRYSTALLIZED SOLID AND ITS PROCESS FOR PREPARATION

(75) Inventors: Philippe Caullet, Illzach (FR); Jean-Louis Paillaud, Mulhouse (FR); Nicolas Bats, Feyzin (FR); Yannick Lorgouilloux, Limoges (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 478 days.

(21) Appl. No.: 12/301,889

(22) PCT Filed: May 10, 2007

(86) PCT No.: PCT/FR2007/000795
§ 371 (c)(1),
(2), (4) Date: Aug. 23, 2010

(87) PCT Pub. No.: WO2007/135266
PCT Pub. Date: Nov. 29, 2007

(65) Prior Publication Data
US 2010/0324320 A1  Dec. 23, 2010

(30) Foreign Application Priority Data
May 24, 2006 (FR) ...................................... 06 04915

(51) Int. Cl.
*C01B 39/46* (2006.01)
*C01B 39/48* (2006.01)

(52) U.S. Cl. ............. 423/718; 423/709; 502/60; 502/64

(58) Field of Classification Search .................. 423/709, 423/718; 502/60, 64
See application file for complete search history.

(56) References Cited

U.S. PATENT DOCUMENTS

| | | | |
|---|---|---|---|
| 5,202,014 A * | 4/1993 | Zones et al. | 208/46 |
| 8,101,154 B2 * | 1/2012 | Lorgouilloux et al. | 423/718 |
| 8,124,038 B2 * | 2/2012 | Lorgouilloux et al. | 423/305 |
| 8,216,546 B2 * | 7/2012 | Lorgouilloux et al. | 423/718 |
| 2003/0180217 A1 * | 9/2003 | Canos et al. | 423/718 |
| 2005/0067604 A1 * | 3/2005 | Harbuzaru et al. | 252/62 |
| 2006/0036120 A1 * | 2/2006 | Corma Canos et al. | 585/467 |
| 2006/0110321 A1 * | 5/2006 | Corma et al. | 423/718 |
| 2011/0166402 A1 * | 7/2011 | Roth et al. | 585/422 |
| 2011/0243839 A1 * | 10/2011 | Moscoso et al. | 423/718 |

OTHER PUBLICATIONS

Mathieu, Y et al. "Synthesis and Characterization of IM-10: A New Microporous Silicogermanate with a Novel Topology." XP 004587732 Microporous and Mesoporous Materials vol. 75, No. 1-2 (Oct. 12, 2004): 13-22.

* cited by examiner

*Primary Examiner* — David M Brunsman
(74) *Attorney, Agent, or Firm* — Millen, White, Zelano & Branigan, P.C.

(57) ABSTRACT

The invention relates to a crystallized solid, referred to by the name IM-13, which has an X-ray diffraction diagram as provided below. Said solid has a chemical composition that is expressed according to the general formula $mXO_2: nYO_2: pZ_2O_3: qR: sF: wH_2O$, where R represents one or more organic radical(s), X represents one or more tetravalent element(s) different from germanium, Y represents germanium, Z represents at least one trivalent element, and F is fluorine.

15 Claims, 1 Drawing Sheet

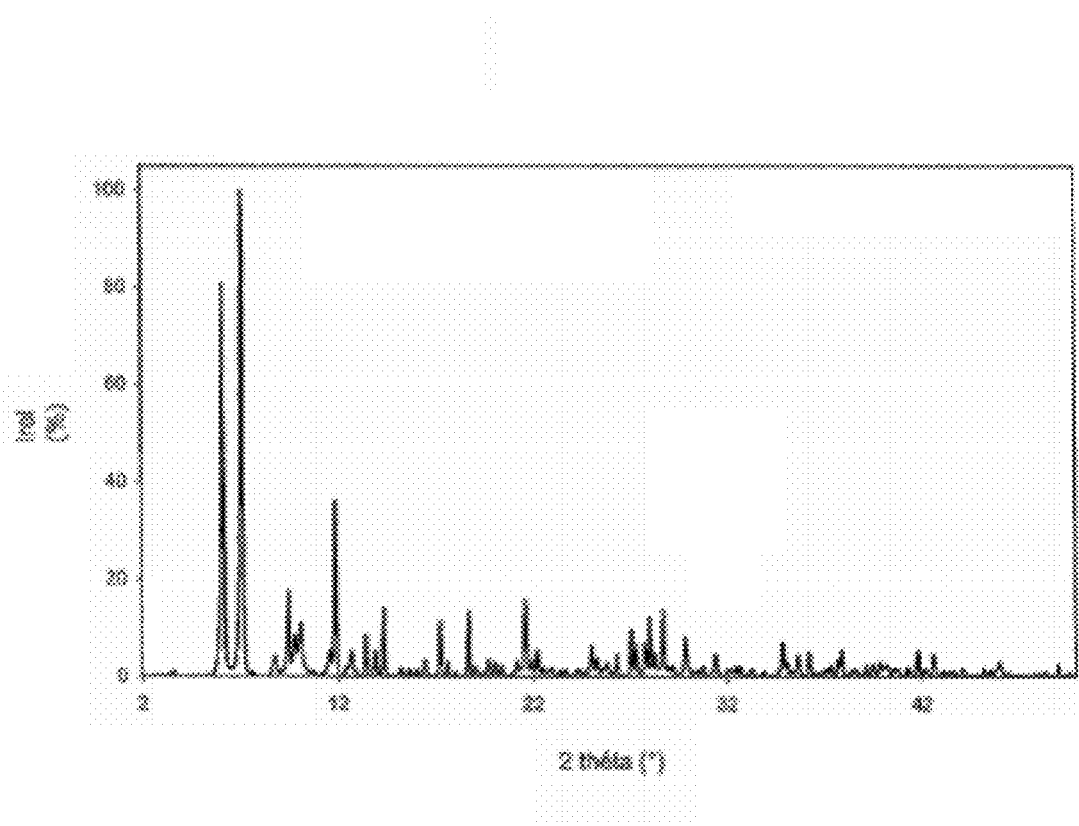

IM-13 CRYSTALLIZED SOLID AND ITS PROCESS FOR PREPARATION

The application is a 371 filing of PCT/FR2007/000795, filed May 10, 2007.

TECHNICAL FIELD

This invention relates to a new crystallized solid that is called IM-13 below and that has a new crystalline structure as well as a process for preparation of said solid.

PRIOR ART

During recent years, the search for new microporous molecular sieves has led to the synthesis of a large variety of this class of products. A large variety of aluminosilicates with a zeolitic structure that are characterized in particular by their chemical composition, the diameter of the pores that they contain, and the shape and the geometry of their microporous system has thus been developed.

Among the zeolites synthesized for about forty years, a certain number of solids have made it possible to achieve significant progress in the fields of adsorption and catalysis. Among the latter, it is possible to cite the Y zeolite (U.S. Pat. No. 3,130,007) and the ZSM-5 zeolite (U.S. Pat. No. 3,702,886). The number of new molecular sieves that cover the zeolites, synthesized each year, is in constant progression. To have a more complete description of the different molecular sieves that have been discovered, it is possible to refer in a useful manner to the following work: "Atlas of Zeolite Framework Types," Ch. Baerlocher, W. M. Meier and D. H. Olson, Fifth Revised Edition, 2001, Elsevier. It is possible to cite the NU-87 zeolite (U.S. Pat. No. 5,178,748), the MCM-22 zeolite (U.S. Pat. No. 4,954,325) or else the gallophosphate (cloverite) of the CLO-structural type (U.S. Pat. No. 5,420,279) or else the zeolites ITQ-12 (U.S. Pat. No. 6,471,939), ITQ-13 (U.S. Pat. No. 6,471,941), CIT-5 (U.S. Pat. No. 6,043,179), ITQ-21 (WO-02/092511), ITQ-22 (Corma, A. et al., Nature Materials 2003, 2, 493), SSZ-53 (Burton, A., et al., Chemistry: A Eur. Journal, 2003, 9, 5737), SSZ-59 (Burton, A., et al., Chemistry: A Eur. Journal, 2003, 9, 5737), SSZ-58 (Burton, A., et al., J. Am. Chem. Soc., 2003, 125, 1633) and UZM-5 (Blackwell, C. S. et al., Angew. Chem. [Applied Chemistry], Int. Ed., 2003, 42, 1737).

Several zeolites that were cited above have been synthesized in a fluoride medium in which the mobilizing agent is not the usual hydroxide ion but the fluoride ion according to a process that was initially described by Flanigen et al (U.S. Pat. No. 4,073,865), then developed by J.-L. Guth et al. (Proc. Int. Zeol. Conf., Tokyo, 1986, p. 121). The pH values of the synthesis media are typically close to neutrality. One of the advantages of these fluorinated reaction systems is to allow purely silicic zeolites that contain fewer defects than the zeolites that are obtained in the traditional OH medium to be obtained (J. M. Chézeau et al., Zeolites, 1991, 11, 598). Another decisive advantage that is linked to the use of fluorinated reaction media is to make it possible to obtain new silicic framework topologies that contain double cycles with four tetrahedra (D4R) as in the case of the ITQ-7, ITQ-12 and ITQ-13 zeolites. Furthermore, the joint use of germanium and silicon sources in the synthesis media may also make it possible to obtain new frameworks of this type, i.e., containing D4R units, both in non-fluorinated standard basic medium and in fluorinated medium, as in the case of the ITQ-17 and ITQ-21 zeolites (A. Corm et al., Chem. Commun., 2001, 16, 1486, Chem. Commun., 2003, 9, 1050), or IM-12 (J. L. Paillaud et al., Science, 2004, 304, 990).

DESCRIPTION OF THE INVENTION

This invention has as its object a new crystallized solid, called an IM-13 crystallized solid, which has a new crystalline structure. Said solid has a chemical composition that is expressed by the following general formula: $mXO_2$: $nYO_2$: $pZ_2O_3$: $qR$: $sF$: $wH_2O$, in which R represents one or more organic radical(s), X represents one or more tetravalent element(s) different from germanium, Y represents germanium, Z represents at least one trivalent element, and F is fluorine, whereby m, n, p, q, s and w respectively represent the number of mols of $XO_2$, $YO_2$, $Z_2O_3$, R, F and $H_2O$, and m is between 0 and 0.2, n is between 0.8 and 1, p is between 0 and 0.5, q is between 0 and 0.7, s is between 0 and 0.7, and w is between 0 and 5.

The IM-13 crystallized solid according to the invention has an X-ray diffraction diagram that includes at least the lines that are inscribed in Table 1. This new IM-13 crystallized solid has a new crystalline structure.

This diffraction diagram is obtained by radiocrystallographic analysis by means of a diffractometer by using the standard powder method with $K\alpha_1$ radiation of copper ($\lambda=1.5406$ Å). Starting from the position of the peaks of diffraction represented by the angle $2\theta$, the characteristic recticular equidistances $d_{hkl}$ of the sample are calculated by Bragg's equation. The measuring error $\Delta(d_{hkl})$ to $d_{hkl}$ is calculated, based on the absolute error $\Delta(2\theta)$ that is assigned to the measurement of $2\theta$, by Bragg's equation. An absolute error $\Delta(2\theta)$ that is equal to $\pm 0.02°$ is commonly allowed. The relative intensity $I_{rel}$ that is assigned to each value of $d_{hkl}$ is measured according to the height of the corresponding diffraction peak. The X-ray diffraction diagram of the IM-13 crystallized solid according to the invention, in its crude synthesis form, comprises at least the lines to the values of $d_{hkl}$ provided in Table 1. In the $d_{hkl}$ column, the mean values of the inter-reticular distances are indicated in angstroms (Å). Each of these values should be provided with the measuring error $\Delta(d_{hkl})$ of between $\pm 0.2$ Å and $\pm 0.003$ Å.

TABLE 1

Mean values of $d_{hkl}$ and relative intensities measured on an X-ray diffraction diagram of the crude synthesis IM-13 crystallized solid

| 2 theta (°) | $d_{hkl}$ (Å) | $I/I_o$ |
|---|---|---|
| 3.58 | 24.64 | ff |
| 6.21 | 14.23 | F |
| 7.17 | 12.32 | FF |
| 8.77 | 10.07 | ff |
| 9.49 | 9.31 | f |
| 9.84 | 8.99 | ff |
| 10.14 | 8.72 | ff |
| 11.62 | 7.61 | ff |
| 11.91 | 7.42 | mf |
| 12.45 | 7.10 | ff |
| 12.71 | 6.96 | ff |
| 12.94 | 6.84 | ff |
| 13.44 | 6.58 | ff |
| 13.91 | 6.36 | ff |
| 14.37 | 6.16 | ff |
| 15.25 | 5.80 | ff |
| 15.66 | 5.65 | ff |
| 16.08 | 5.51 | ff |
| 16.48 | 5.38 | ff |
| 17.25 | 5.14 | ff |
| 17.63 | 5.03 | ff |
| 18.70 | 4.74 | ff |

TABLE 1-continued

Mean values of $d_{hkl}$ and relative intensities measured on an X-ray diffraction diagram of the crude synthesis IM-13 crystallized solid

| 2 theta (°) | $d_{hkl}$ (Å) | $I/I_o$ |
|---|---|---|
| 19.04 | 4.66 | ff |
| 19.73 | 4.50 | ff |
| 20.05 | 4.43 | ff |
| 20.38 | 4.35 | ff |
| 21.19 | 4.19 | ff |
| 21.63 | 4.11 | f |
| 21.92 | 4.05 | ff |
| 22.23 | 4.00 | ff |
| 22.51 | 3.95 | ff |
| 22.95 | 3.87 | ff |
| 23.37 | 3.80 | ff |
| 23.67 | 3.76 | ff |
| 25.04 | 3.55 | ff |
| 25.29 | 3.52 | ff |
| 25.81 | 3.45 | ff |
| 26.33 | 3.38 | ff |
| 27.08 | 3.29 | ff |
| 27.31 | 3.26 | ff |
| 27.81 | 3.21 | ff |
| 28.05 | 3.18 | ff |
| 28.28 | 3.15 | ff |
| 28.75 | 3.10 | ff |
| 29.21 | 3.05 | ff |
| 29.89 | 2.99 | ff | where
FF = very high;
m = mean;
f = low;
F = high;
mf = medium low;
ff = very low.

The relative intensity $I/I_o$ is provided in relation to a relative intensity scale where a value of 100 is assigned to the most intense line of the X-ray diffraction diagram: ff<15; 15≦f<30; 30≦mf<50; 50≦m<65; 65≦F<85; FF≧85.

BRIEF DESCRIPTION OF THE DRAWING

The IM-13 crystallized solid according to the invention has a new crystalline structure with a base or topology that is characterized by its X diffraction diagram in crude synthesis form provided by FIG. 1.

Said IM-13 solid has a chemical composition that is defined by the following general formula: $mXO_2$: $nYO_2$: $pZ_2O_3$: $qR$: $sF$: $wH_2O$ (I), where R represents one or more organic radical(s), X represents one or more tetravalent element(s) different from germanium, Y represents germanium, Z represents at least one trivalent element, and F is fluorine. In formula (I), m, n, p, q, s and w respectively represent the number of mols of $XO_2$, $YO_2$, $Z_2O_3$, R, F and $H_2O$, and m is between 0 and 0.2, n is between 0.8 and 1, p is between 0 and 0.5, q is between 0 and 0.7, s is between 0 and 0.7, and w is between 0 and 5.

Advantageously, the X/Ge ratio of the framework of the IM-13 crystallized solid according to the invention is between 0 and 0.3, preferably between 0 and 0.25, and very preferably between 0.01 and 0.1. The ratio {(n+m)/p} is greater than or equal to 5 and is preferably greater than or equal to 7. The value of p is preferably between 0 and 0.5, very preferably between 0 and 0.4, and even more preferably between 0.01 and 0.4. The value of q is between 0 and 0.7, advantageously between 0.01 and 0.7, and very advantageously between 0.1 and 0.3. According to the invention, s is between 0 and 0.7, preferably, s is between 0.1 and 0.7, and very preferably, s is between 0.1 and 0.2. The value taken by w is, according to the invention, between 0 and 0.5, preferably between 0.2 and 5.

According to the invention, X is preferably selected from among silicon, tin and titanium, Y is germanium, and Z is preferably selected from among aluminum, boron, iron, indium and gallium, and very preferably Z is aluminum. In a preferred manner, X is silicon: the IM-13 crystallized solid according to the invention is then a crystallized germanosilicate that has an X-ray diffraction diagram that is identical to the one that is described in Table 1 when it is found in its crude synthesis form. Even more preferably, X is silicon, and Z is aluminum: the IM-13 crystallized solid according to the invention is then a crystallized aluminogermanosilicate that has an X-ray diffraction diagram that is identical to the one that is described in Table 1 when it is found in its crude synthesis form.

In the case where the IM-13 crystallized solid according to the invention comes in its crude synthesis form, i.e., obtained directly from the synthesis and prior to any stage of calcinations(s) and/or ion exchange(s) that are well known to one skilled in the art, said IM-13 solid comprises at least one organic radical such as the one that is described below or its decomposition products, or else its precursors. In its crude synthesis form, the organic radical(s) R that is (are) present in the general formula and that define the IM-13 solid is (are) at least in part, and preferably entirely, said organic radical(s). According to a preferred embodiment of the invention, R is the 1,6-diaminohexane. Said organic radical R, which plays the role of structuring agent, can be eliminated by the standard methods of the prior art such as heat treatments and/or chemical treatments.

The IM-13 crystallized solid according to the invention is preferably a zeolitic solid.

The invention also relates to a process for preparation of the IM-13 crystallized solid in which an aqueous mixture that comprises at least one source of at least one $YO_2$ oxide, optionally at least one source of at least one $XO_2$ oxide, optionally at least one source of at least one $Z_2O_3$ oxide, and at least one organic radical R, and optionally at least one source of fluoride ions, is reacted, whereby the mixture preferably has the following molar composition:

$(XO_2+YO_2)/Z_2O_3$: at least 5, preferably at least 7, $H_2O/(XO_2+YO_2)$: 1 to 50, preferably 2 to 30, $R/(XO_2+YO_2)$: 0.1 to 3, preferably 0.25 to 1, $YO_2/XO_2$: 0.5 to ∞, preferably 1.5 to ∞, and very preferably 4 to ∞, $F/(XO_2+YO_2)$: 0 to 2, preferably 0.1 to 1, where X is one or more tetravalent element(s) different from germanium, preferably silicon, Y is germanium, Z is one or more trivalent element(s) selected from the group that is formed by the following elements: aluminum, iron, boron, indium and gallium, preferably aluminum.

According to the process according to the invention, R is an organic radical that plays the role of organic structuring agent. Preferably, R is the nitrogen-containing compound 1,6-diaminohexane.

The source of the element X can be any compound that comprises the element X and can release this element in aqueous solution in reactive form. Advantageously, when the element X is silicon, the silica source can be any of those currently used in the synthesis of zeolites, for example solid silica in powder form, silicic acid, colloidal silica or dissolved silica or tetraethoxysilane (TEOS). Among the silicas in powder form, it is possible to use precipitated silicas, in particular those that are obtained by precipitation starting from an alkaline metal silicate solution, such as aerosol silicas, pyrogenated silicas, for example "CAB-O-SIL," and silica gels. It is possible to use colloidal silicas that have different particle sizes, for example with a mean equivalent diameter of between 10 and 15 nm or between 40 and 50 nm, such as the ones that are marketed under the filed trademark "LUDOX."

The source of the element Z can be any compound that comprises the element Z and that can release this element in aqueous solution in reactive form. In the preferred case where Z is aluminum, the alumina source is preferably sodium aluminate, or an aluminum salt, for example, chloride, nitrate, hydroxide or sulfate, an alkoxide of aluminum or of alumina itself, preferably in hydrated or hydratable form, such as, for example, colloidal alumina, pseudoboehmite, gamma-alumina or alpha- or beta-trihydrate. It is also possible to use mixtures of the sources that are cited above.

The source of the element Y can be, for example, a germanium oxide $GeO_2$.

The fluorine can be introduced in the form of salts of alkaline metals or ammonium, such as, for example, $NaF$, $NH_4F$, $NH_4HF_2$, or in the form of hydrofluoric acid or else in the form of hydrolyzable compounds that can release fluoride anions into the water such as silicon fluoride $SiF_4$ or ammonium fluorosilicates $(NH_4)_2SiF_6$ or sodium fluorosilicates $Na_2SiF_6$.

According to a preferred embodiment of the process according to the invention, an aqueous mixture that comprises silica, optionally alumina, a germanium oxide, 1,6-diaminohexane and a source of fluoride ions is reacted.

The process according to the invention consists in preparing an aqueous reaction mixture that is called a gel and that contains at least one source of at least one $YO_2$ oxide, optionally at least one source of at least one $XO_2$ oxide, optionally at least one source of at least one $Z_2O_3$ oxide, optionally at least one source of fluoride ions, and at least one organic radical R. The amounts of said reagents are adjusted so as to impart to this gel a composition that allows its crystallization into IM-13 crystallized solid of general formula $mXO_2: nYO_2: pZ_2O_3: qR: sF: wH_2O$, where m, n, p, q, s and w meet the criteria that are defined above. Then, the gel is subjected to a hydrothermal treatment until the IM-13 crystallized solid is formed. The gel is advantageously put under hydrothermal conditions under an autogenous reaction pressure, optionally by adding gas, for example nitrogen, at a temperature of between 120° C. and 200° C., preferably between 140° C. and 180° C., and even more preferably at a temperature that does not exceed 175° C. until the IM-13 solid crystals form according to the invention. The period that is necessary for obtaining the crystallization generally varies between 1 hour and several months based on the composition of the reagents in the gel, the stifling and the reaction temperature. The reaction is generally carried out while being stirred or without being stirred, preferably without being stirred.

It may be advantageous to add seeds to the reaction mixture so as to reduce the time that is necessary for the formation of crystals and/or the total crystallization period. It may also be advantageous to use seeds so as to promote the formation of the IM-13 crystallized solid to the detriment of impurities. Such seeds comprise crystallized solids, in particular IM-13 solid crystals. The crystalline seeds are generally added in a proportion of between 0.01 and 10% of the mass of the $(XO_2+YO_2)$ oxides, whereby $XO_2$ is preferably silica, used in the reaction mixture.

At the end of the reaction, the solid phase is filtered and washed; it is then ready for subsequent stages such as drying, dehydration and calcination and/or ion exchange. For these stages, all of the conventional methods that are known to one skilled in the art can be used.

This invention also relates to the use of said IM-13 solid as an adsorbent.

Preferably, the organic radical, preferably 1,6 diaminohexane, is removed from said IM-13 solid when it is used as an adsorbent. When it is used as an adsorbent, the IM-13 crystallized solid according to the invention is generally dispersed in an inorganic matrix phase that contains channels and cavities that allow the access of the fluid that is to separate into the crystallized solid. These matrices are preferably mineral oxides, for example silicas, aluminas, silica-aluminas or clays. The matrix in general represents between 2 and 25% by mass of the thus formed adsorbent.

The invention is illustrated by means of the following examples.

EXAMPLE 1

Preparation of an IM-13 Solid According to the Invention 1.613 g of 1,6-diaminohexane (Aldrich) is added to 10 ml of distilled water in a 20 ml Teflon container. The mixture is stirred for 5 minutes using a magnetic stifling mechanism, then 2.905 g of germanium oxide (Aldrich) is added. The mixture is stirred for a period of 4 hours.

The molar composition of the gel that is obtained is: $GeO_2$: 0.5 1,6-diaminohexane:$20H_2O$.

The Teflon jacket that contains the synthesis mixture (pH~12.5) is then introduced into an autoclave, which is placed in a drying oven at 170° C. for a duration of 14 days without being stirred. After filtration, the product that is obtained is washed several times with distilled water. It is then dried at 70° C. for 24 hours. The mass of dry product that is obtained is approximately 2.75 g.

The dried solid product was analyzed by X-ray diffraction and identified as consisting of IM-13 solid.

EXAMPLE 2

Preparation of an IM-13 Solid According to the Invention 4.032 g of 1,6-diaminohexane (Aldrich) is added to 9.459 ml of distilled water in a 20 ml Teflon container. The mixture is stirred for 5 minutes using a magnetic stifling mechanism, then 5.811 g of germanium oxide (Aldrich) is added. The mixture is stirred for 1 hour. 3.096 ml (2.891 g) of TEOS (tetraethoxysilane, Fluka) is then introduced. The mixture is then stirred for 6 to 8 hours at ambient temperature, so as to evaporate the ethanol that is formed by the hydrolysis of TEOS. The subsequent addition of 1.536 ml (1.735 g) of an aqueous HF solution (40% by mass of hydrofluoric acid, Carlo Erba) is manifested as an increase in the viscosity of the reaction mixture. The mixture is then stirred manually using a stainless steel spatula for 5 to 10 minutes. After weigh-in and adjustment of the required water content, the molar composition of the mixture that is obtained is: $0.2 SiO_2:0.8 GeO_2$: 0.5 1,6-diaminohexane:0.5 HF :$8 H_2O$.

The Teflon jacket that contains the synthesis mixture (pH~12.5) is then introduced into an autoclave, which is placed in a drying oven at 170° C. for a period of 14 days without being stifled.

After filtration, the product that is obtained is washed several times with distilled water. It is then dried at 70° C. for 24 hours. The mass of dry product that is obtained is approximately 6.72 g.

The dried solid product was analyzed by X-ray diffraction and identified as consisting of IM-13 solid.

EXAMPLE 3

Preparation of an IM-13 Solid According to the Invention 4.032 g of 1,6-diaminohexane (Aldrich) is added to 9.422 ml of distilled water in a 20 ml Teflon container. The mixture is stirred for 5 minutes using a magnetic stifling mechanism, then 0.108 g of aluminum hydroxide (63 to 67% by mass of $Al_2O_3$, Fluka) and 5.811 g of germanium oxide (Aldrich) are added. The mixture is stirred for 1 hour. 3.096 ml (2.891 g) of TEOS (tetraethoxysilane, Fluka) is then introduced. The mixture is then stirred for 6 to 8 hours at ambient temperature, so as to evaporate the ethanol that is formed by the hydrolysis of TEOS. The subsequent addition of 1.536 ml (1.735 g) of an aqueous HF solution (40% by mass of hydrofluoric acid, Carlo Erba) is manifested as an increase in the viscosity of the reaction mixture. The mixture is then stirred manually using a stainless steel spatula for 5 to 10 minutes. After weigh-in and adjustment of the required water content, the molar composition of the mixture that is obtained is: $0.2 SiO_2$:$0.8 GeO_2$: $0.01 Al_2O_3$:$0.5$ 1,6-diaminohexane: 0.5 HF :$8H_2O$.

The Teflon jacket that contains the synthesis mixture (pH~12.5) is then introduced into an autoclave, which is placed in a drying oven at 170° C. for a period of 14 days without being stifled.

After filtration, the product that is obtained is washed several times with distilled water. It is then dried at 70° C. for 24 hours. The mass of dry product that is obtained is approximately 6.87 g. The dried solid product was analyzed by X-ray diffraction and identified as consisting of IM-13 solid.

EXAMPLE 4

Preparation of an IM-13 Solid According to the Invention 4.032 g of 1,6-diaminohexane (Aldrich) is added to 8.921 ml of distilled water in a 20 ml Teflon container. The mixture is stirred for 5 minutes using a magnetic stifling mechanism, then 0.108 g of aluminum hydroxide (63 to 67% by mass of $Al_2O_3$, Fluka) and 7.264 g of germanium oxide (Aldrich) are added. The mixture is stirred for 1 hour. Approximately 0.145 g of the product of the synthesis that is described in Example 1, previously ground (that is, 2% of the mass of the $GeO_2$ oxide), is then introduced as seeds. The mixture is then stirred for 3 hours. The subsequent addition of 1.536 ml (1.735 g) of an aqueous HF solution (40% by mass of hydrofluoric acid, Carlo Erba) is manifested as an increase in the viscosity of the reaction mixture. The mixture is then stirred manually using a stainless steel spatula for 5 to 10 minutes. The molar composition of the gel that is obtained is: $1 GeO_2$: $0.01 Al_2O_3$: $0.5$ 1,6-diaminohexane: 0.5 HF : $8H_2O$ (+2% seeds by mass relative to the $GeO_2$).

The Teflon jacket that contains the synthesis mixture (pH~12.5) is then introduced into an autoclave, which is placed in a drying oven at 170° C. for a period of 14 days without being stifled.

After filtration, the product that is obtained is washed several times with distilled water. It is then dried at 70° C. for 24 hours. The mass of dry product that is obtained is approximately 7.47 g.

The dried solid product was analyzed by X-ray diffraction and identified as consisting of IM-13 solid.

EXAMPLE 5

Preparation of an Adsorbent that Contains the IM-13 Crystallized Solid

The solid that is used is the synthetic crude solid of Example 2 and comprises the organic radical 1,6 diaminohexane. This solid first undergoes a heating with flushing by nitrogen at the temperature of 200° C. for 4 hours and then a calcination always under nitrogen atmosphere at 550° C. for 8 hours. Following these first treatments, the solid that is obtained is calcined at 550° C. for 8 hours under a stream of air and then for 8 more hours under a stream of oxygen.

The solid that is obtained is then put in extrudate form by mixing with boehmite (Pural SB3, Sasol) in a Z-arm mixing machine and by extrusion of the paste that is obtained with a piston extruder. The extrudates are then dried at 120° C. for 12 hours in air and calcined at 550° C. for 2 hours in a stream of air in a muffle furnace.

The thus prepared adsorbent consists of 80% IM-13 zeolitic solid and 20% alumina.

The invention claimed is:

1. IM-13 crystallized solid that has an X-ray diffraction diagram that includes at least the lines that are inscribed in the table below:

| 2 theta (°) | $d_{hkl}$ (Å) | $I/I_o$ |
|---|---|---|
| 3.58 | 24.64 | ff |
| 6.21 | 14.23 | F |
| 7.17 | 12.32 | FF |
| 8.77 | 10.07 | ff |
| 9.49 | 9.31 | f |
| 9.84 | 8.99 | ff |
| 10.14 | 8.72 | ff |
| 11.62 | 7.61 | ff |
| 11.91 | 7.42 | mf |
| 12.45 | 7.10 | ff |
| 12.71 | 6.96 | ff |
| 12.94 | 6.84 | ff |
| 13.44 | 6.58 | ff |
| 13.91 | 6.36 | ff |
| 14.37 | 6.16 | ff |
| 15.25 | 5.80 | ff |
| 15.66 | 5.65 | ff |
| 16.08 | 5.51 | ff |
| 16.48 | 5.38 | ff |
| 17.25 | 5.14 | ff |
| 17.63 | 5.03 | ff |
| 18.70 | 4.74 | ff |
| 19.04 | 4.66 | ff |
| 19.73 | 4.50 | ff |
| 20.05 | 4.43 | ff |
| 20.38 | 4.35 | ff |
| 21.19 | 4.19 | ff |
| 21.63 | 4.11 | f |
| 21.92 | 4.05 | ff |
| 22.23 | 4.00 | ff |
| 22.51 | 3.95 | ff |
| 22.95 | 3.87 | ff |
| 23.37 | 3.80 | ff |
| 23.67 | 3.76 | ff |
| 25.04 | 3.55 | ff |
| 25.29 | 3.52 | ff |
| 25.81 | 3.45 | ff |

-continued

| 2 theta (°) | $d_{hkl}$ (Å) | $I/I_o$ |
|---|---|---|
| 26.33 | 3.38 | ff |
| 27.08 | 3.29 | ff |
| 27.31 | 3.26 | ff |
| 27.81 | 3.21 | ff |
| 28.05 | 3.18 | ff |
| 28.28 | 3.15 | ff |
| 28.75 | 3.10 | ff |
| 29.21 | 3.05 | ff |
| 29.89 | 2.99 | ff | where FF=very high; m=mean; f=low; F=high; mf=medium low; ff=very low and that has a chemical composition that is expressed by the following general formula: $mXO_2: nYO_2: pZ_2O_3: qR: sF: wH_2O$, in which R represents one or more organic radical(s), X represents one or more tetravalent element(s) different from germanium, Y represents germanium, Z represents at least one trivalent element, and F is fluorine, whereby m, n, p, q, s and w respectively represent the number of mols of $XO_2$, $YO_2$, $Z_2O_3$, R, F and $H_2O$, and m is between 0 and 0.2, n is between 0.8 and 1, p is between 0 and 0.5, q is between 0 and 0.7, s is between 0 and 0.7, and w is between 0 and 5.

2. IM-13 crystallized solid according to claim 1 in which X is silicon.

3. IM-13 crystallized solid according to claim 2 in which Z is aluminum.

4. IM-13 crystallized solid according to claim 3, in which the ratio {(n+m)/p} is greater than or equal to 5, p is between 0 and 0.4, q is between 0.1 and 0.3, s is between 0.1 and 0.2, and w is between 0.2 and 5.

5. IM-13 crystallized solid according to claim 3, wherein R is 1,6 diaminohexane.

6. IM-13 crystallized solid according to claim 2, in which the ratio {(n+m)/p} is greater than or equal to 5, p is between 0 and 0.4, q is between 0.1 and 0.3, s is between 0.1 and 0.2, and w is between 0.2 and 5.

7. IM-13 crystallized solid according to claim 1 in which Z is aluminum.

8. IM-13 crystallized solid according to claim 7, in which the ratio {(n+m)/p} is greater than or equal to 5, p is between 0 and 0.4, q is between 0.1 and 0.3, s is between 0.1 and 0.2, and w is between 0.2 and 5.

9. IM-13 crystallized solid according to claim 1, in which the ratio {(n+m)/p} is greater than or equal to 5, p is between 0 and 0.4, q is between 0.1 and 0.3, s is between 0.1 and 0.2, and w is between 0.2 and 5.

10. A process for preparation of an IM-13 crystallized solid according to claim 1, comprising initiating mixing at least one source of at least one $YO_2$ oxide, optionally at least one source of at least one $XO_2$ oxide, optionally at least one source of at least one $Z_2O_3$ oxide, optionally at least one source of fluoride ions, and at least one organic radical R, then subjecting the resultant mixture to hydrothermal treatment until said IM-13 crystallized solid is formed.

11. A process for preparation of an IM-13 crystallized solid according to claim 10, such that the molar composition of the reaction mixture is:

$(XO_2+YO_2)/Z_2O_3$: at least 5, $H_2O/(XO_2+YO_2)$: 1 to 50, $R/(XO_2+YO_2)$: 0.1 to 3, $YO_2/XO_2$: 0.5 to ∞, $F/(XO_2+YO_2)$: 0 to 2.

12. A process for preparation according to claim 10 where said organic radical R is 1,6 diaminohexane.

13. A process for preparation according to claim 10, wherein seeds are added into the reaction mixture.

14. An adsorbent composition comprising the IM-crystallized solid of claim 1 disposed in a matrix of mineral oxide.

15. An adsorbent composition according to claim 14, wherein R is removed from said IM-crystallized solid.

* * * * *

UNITED STATES PATENT AND TRADEMARK OFFICE
CERTIFICATE OF CORRECTION

PATENT NO.         : 8,372,376 B2                                          Page 1 of 1
APPLICATION NO. : 12/301889
DATED              : February 12, 2013
INVENTOR(S)        : Caullet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this

First Day of September, 2015

Michelle K. Lee
*Director of the United States Patent and Trademark Office*